Patented Dec. 2, 1952

2,620,344

UNITED STATES PATENT OFFICE 2,620,344

THIANAPHTHACYL SULFIDES

William S. Emerson, Dayton, Ohio, assignor to Monsanto Chemical Company, St. Louis, Mo., a corporation of Delaware No Drawing. Application October 22, 1951, Serial No. 252,582

15 Claims. (Cl. 260—330.5)

The present invention relates to organic sulfur compounds and deals more specifically with new thianaphthyl keto sulfides and to methods of preparing the same.

According to the invention there are obtained new and valuable thianaphthacyl sulfides by contacting haloacetylthianaphthenes with an alkali metal or ammonium sulfide, substantially according to the scheme:

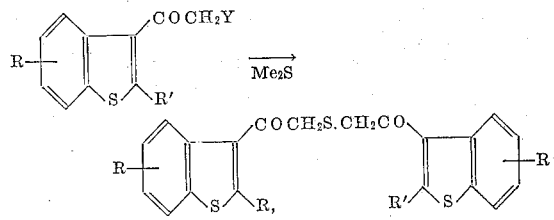

in which R and R' are selected from the class consisting of hydrogen, chlorine, bromine and alkyl radicals of from 1 to 4 carbon atoms, Y is selected from the class consisting of chlorine and bromine, and Me is selected from the class consisting of alkali metal and ammonium.

As illustrative of haloacetylthianaphthenes which may be reacted with an alkali metal or ammonium sulfide to yield the thianaphthacyl sulfides may be mentioned 3-chloroacetylthianaphthene or 3-bromoacetylthianaphthene to yield di-3-thianaphthacyl sulfide, 6-chloro-3-chloroacetylthianaphthene to yield bis(6-chloro-3-thianaphthacyl) sulfide; 4- chloro-3-bromoacetylthianaphthene to yield bis(4-chloro-3-thianaphthacyl) sulfide; 5 - methyl - 3 - chloroacetylthianaphthene to yield bis(5-methyl-3-thianaphthacyl) sulfide; 6 - methyl - 3 - bromoacetylthianaphthene to yield bis(6-methyl-3-thianaphthacyl) sulfide; 2-butyl-3-bromoacetylthianaphthene to yield bis(2 - butyl - 3 - thianaphthacyl) sulfide; and 5 - bromo - 2 - methyl-3 - chloroacetylthianaphthene to yield bis(5-bromo-2-methyl-3-thianaphthacyl) sulfide. Inorganic sulfides which may be employed include sodium sulfide, potassium sulfide, lithium sulfide and ammonium sulfide. The useful haloacetylthianaphthenes are readily obtainable compounds which may be prepared, for example, by the chlorination or bromination of 3-acetylthianaphthene or the appropriate nuclearly alkylated, chlorinated or brominated 3-acetylthianaphthenes, substantiailly as described in my copending application Serial No. 252,583 filed of even date.

Reaction of the haloacetylthianaphthene compounds with the alkali metal or ammonium sulfides to yield the present di-3-thianaphthacyl sulfides is readily effected by contacting the haloacetylthianaphthene with the inorganic sulfide, preferably in the presence of an inert solvent or diluent at ordinary or increased temperatures and allowing the mixture to stand for a time of, say, a few hours to several days until formation of the organic sulfide. Completion of the reaction generally can be noted by pronounced change in the color of the reaction mixture. As solvents or diluents there may be employed an aliphatic alcohol such as methanol, ethanol, isopropanol, or hexanol; aromatic hydrocarbons and their chloro-derivatives such as benzene, toluene, or dichlorobenzene; petroleum hydrocarbon fractions; ethers such as ethyl ether, ethyl isopropyl ether, or dioxane, etc.

The di-3-thianaphthacyl sulfides are readily recovered from the resulting reaction mixture. Generally the organic sulfides may be separated by treating the reaction mixture with water and filtering the resulting slurry or by submitting the organic layer to fractional distillation and/or crystallization.

The present di-thianaphthacyl sulfides are stable, solid, crystalline to waxy materials which may be advantageously employed as lubricant additives, particularly as extreme-pressure resisting agents in gear oils and heavy duty lubricants. Di-3-thianaphthacyl sulfide and some of its alkyl derivatives, i. e., compounds having the general formula

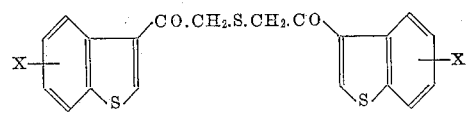

in which X is selected from the class consisting of hydrogen and alkyl radicals of from 1 to 4 carbon atoms are especially useful as rubber antioxidants, and the present compounds are generally valuable as antioxidants and corrosion inhibitors for petroleum lubricating compositions. The chloro- and bromo-thianaphthacyl sulfides are generally useful as biological toxicants, e. g., as insecticides, mothproofing agents, herbicides, etc.

The invention is further illustrated, but not limited, by the following example.

Example

*Di-3-thianaphthacyl sulfide*—A suspension of 21 g. of 3-chloroacetylthianaphthene and 12 g. of sodium sulfide nonahydrate in 200 cc. of ethanol was shaken occasionally and allowed to stand overnight. The mixture, now dark brown, was cooled in ice and diluted with 200 cc. of water. The crude product was separated by filtration and crystallized from a mixture of benzene and ethanol to yield 10.5 g. (55%) of 3-thianaphthacyl sulfide in three crops, M. P. 149.5–150.5°, 149–150°, and 149.0–149.5° C.

ANALYSIS

Calcd. for $C_{20}H_{14}O_2S_3$: C, 62.9; H, 3.67.
Found: C, 63.5; H, 3.94.

The di-3-thianaphthacyl sulfide may be advantageously employed as a lubricant additive.

Operating as in the above example, 3-bromoacetylthianaphthene may be similarly converted to di-3-thianaphthacyl sulfide. Also, instead of the unsubstituted haloacetylthianaphthenes, their alkyl, chloro- or bromo-derivatives may be similarly reacted with sodium sulfide to give the correspondingly substituted thianaphthacyl sulfides. While sodium sulfide is preferred as the inorganic sulfide because of its low cost, other alkali metal sulfides or ammonium sulfide may be used instead.

This application is a continuation in part of my application Serial No. 196,952, filed November 21, 1950.

What I claim is:

1. Compounds having the general formula

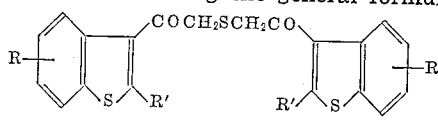

in which R and R' are selected from the class consisting of hydrogen, chlorine, bromine and alkyl radicals of from 1 to 4 carbon atoms.

2. Di-3-thianaphthacyl sulfide.
3. Bis(6-chloro-3-thianaphthacyl) sulfide.
4. Bis(5-methyl-3-thianaphthacyl) sulfide.
5. Bis(6-methyl-3-thianaphthacyl) sulfide.
6. Bis(5 - bromo - 2 - methyl - 3 - thianaphthacyl) sulfide.
7. The method which comprises contacting a thianaphthene compound having the general formula

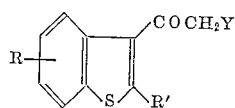

in which R and R' are selected from the class consisting of hydrogen, chlorine, bromine and alkyl radicals of from 1 to 4 carbon atoms and Y is selected from the class consisting of chlorine and bromine, with an inorganic sulfide selected from the class consisting of alkali metal and ammonium sulfides, and recovering from the resulting reaction product thianaphthyl keto sulfides having the general formula

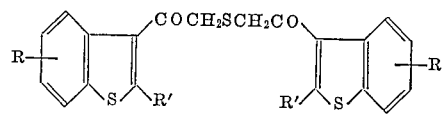

in which R and R' are selected from the class consisting of hydrogen, chlorine, bromine and alkyl radicals of from 1 to 4 carbon atoms.

8. The method which comprises contacting a haloacetylthianaphthene selected from the class consisting of 3-chloro-acetylthianaphthene and 3-bromoacetylthianaphthene with an inorganic compound selected from the class consisting of alkali metal and ammonium sulfides and recovering di-3-thianaphthacyl sulfide from the resulting reaction product.

9. The method which comprises contacting 3-chloro-acetylthianaphthene with an inorganic sulfide selected from the class consisting of alkali metal and ammonium sulfides and recovering di-3-thianaphthacyl sulfide from the resulting reaction product.

10. The method which comprises contacting with sodium sulfide a haloacetylthianaphthene selected from the class consisting of 3-chloroacetylthianaphthene and 3 - bromoacetylthianaphthene and recovering di-3-thianaphthacyl sulfide from the resulting reaction product.

11. The method which comprises contacting 3-chloro-acetylthianaphthene with sodium sulfide and recovering di-3-thianaphthacyl sulfide from the resulting reaction product.

12. The method which comprises contacting 6-chloro-3-chloroacetylthianaphthene with sodium sulfide and recovering bis(6-chloro-3-thianaphthacyl) sulfide from the resulting reaction product.

13. The method which comprises contacting 5-methyl-3-chloroacetylthianaphthene with sodium sulfide and recovering bis(5-methyl-3-thianaphthacyl) sulfide from the resulting reaction product.

14. The method which comprises contacting 6-methyl-3-chloroacetylthianaphthene with sodium sulfide and recovering bis(6-methyl-3-thianaphthacyl) sulfide from the resulting reaction product.

15. The method which comprises contacting 5 - bromo - 2 - methyl - 3 - chloroacetylthianaphthene with sodium sulfide and recovering bis(5 - bromo - 2 - methyl - 3 - thianaphthacyl) sulfide from the resulting reaction product.

WILLIAM S. EMERSON.

No references cited.